(12) United States Patent
Barrett et al.

(10) Patent No.: US 7,414,744 B2
(45) Date of Patent: Aug. 19, 2008

(54) METHOD FOR TRACKING INTERNET FAX JOBS

(75) Inventors: Michael W. Barrett, Fairport, NY (US); Todd Moody, Webster, NY (US); Michael Trent, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 874 days.

(21) Appl. No.: 10/603,985

(22) Filed: Jun. 25, 2003

(65) Prior Publication Data
US 2004/0263894 A1    Dec. 30, 2004

(51) Int. Cl.
G06F 15/00    (2006.01)
H04N 1/32    (2006.01)

(52) U.S. Cl. .................. 358/1.14; 358/1.15; 358/402; 358/405; 379/100.06

(58) Field of Classification Search ............ 358/1.14, 358/1.15, 468, 434, 437, 402; 379/100.01, 379/100.06; 709/206
See application file for complete search history.

(56) References Cited

U.S. PATENT DOCUMENTS

| | | | | |
|---|---|---|---|---|
| 5,822,084 A * | 10/1998 | Hwang | .................. | 358/437 |
| 5,889,595 A * | 3/1999 | Kim et al. | .................. | 358/437 |
| 6,351,316 B2 * | 2/2002 | Saito et al. | .................. | 358/1.15 |
| 6,618,749 B1 * | 9/2003 | Saito et al. | .................. | 358/402 |
| 6,646,755 B1 * | 11/2003 | Iwai et al. | .................. | 358/1.14 |
| 7,000,157 B2 * | 2/2006 | Okamoto et al. | ............ | 709/206 |
| 7,230,733 B2 * | 6/2007 | Adegawa | .................. | 358/1.15 |
| 2002/0019848 A1 * | 2/2002 | Sugawara et al. | ........... | 709/206 |
| 2002/0034284 A1 * | 3/2002 | Kang | .................... | 379/100.06 |
| 2003/0117666 A1 * | 6/2003 | Eguchi et al. | ............... | 358/402 |
| 2003/0123100 A1 * | 7/2003 | Tanimoto | .................... | 358/402 |
| 2003/0128402 A1 * | 7/2003 | Tanimoto | .................... | 358/402 |
| 2003/0164990 A1 * | 9/2003 | Watanabe | .................... | 358/402 |
| 2004/0190076 A1 * | 9/2004 | Nagata et al. | ............... | 358/402 |
| 2006/0064460 A1 * | 3/2006 | Sugawara et al. | ........... | 709/203 |
| 2006/0075031 A1 * | 4/2006 | Wagner et al. | ............... | 709/206 |
| 2007/0153327 A1 * | 7/2007 | Sugawara et al. | ........... | 358/1.15 |
| 2007/0153328 A1 * | 7/2007 | Sugawara et al. | ........... | 358/1.15 |

\* cited by examiner

*Primary Examiner*—Kimberly A Williams
(74) *Attorney, Agent, or Firm*—Fay Sharpe LLP

(57) ABSTRACT

A method for tracking facsimile jobs may be employed to examine, at an originating device, an incoming facsimile transmission for information indicating that the transmission originated at the originating device, in which case the incoming message is determined to be a return message which is the result of an error condition. In a preferred embodiment, a return message so determined is not printed, whereas other types of incoming messages are determined to be valid for printing and are processed accordingly. Further, certain incoming messages that are detected as representing "round-trip jobs" are distinguished from return messages and the former are considered valid for printing.

10 Claims, 2 Drawing Sheets

METHOD FOR TRACKING INTERNET FAX JOBS

Figure 1:
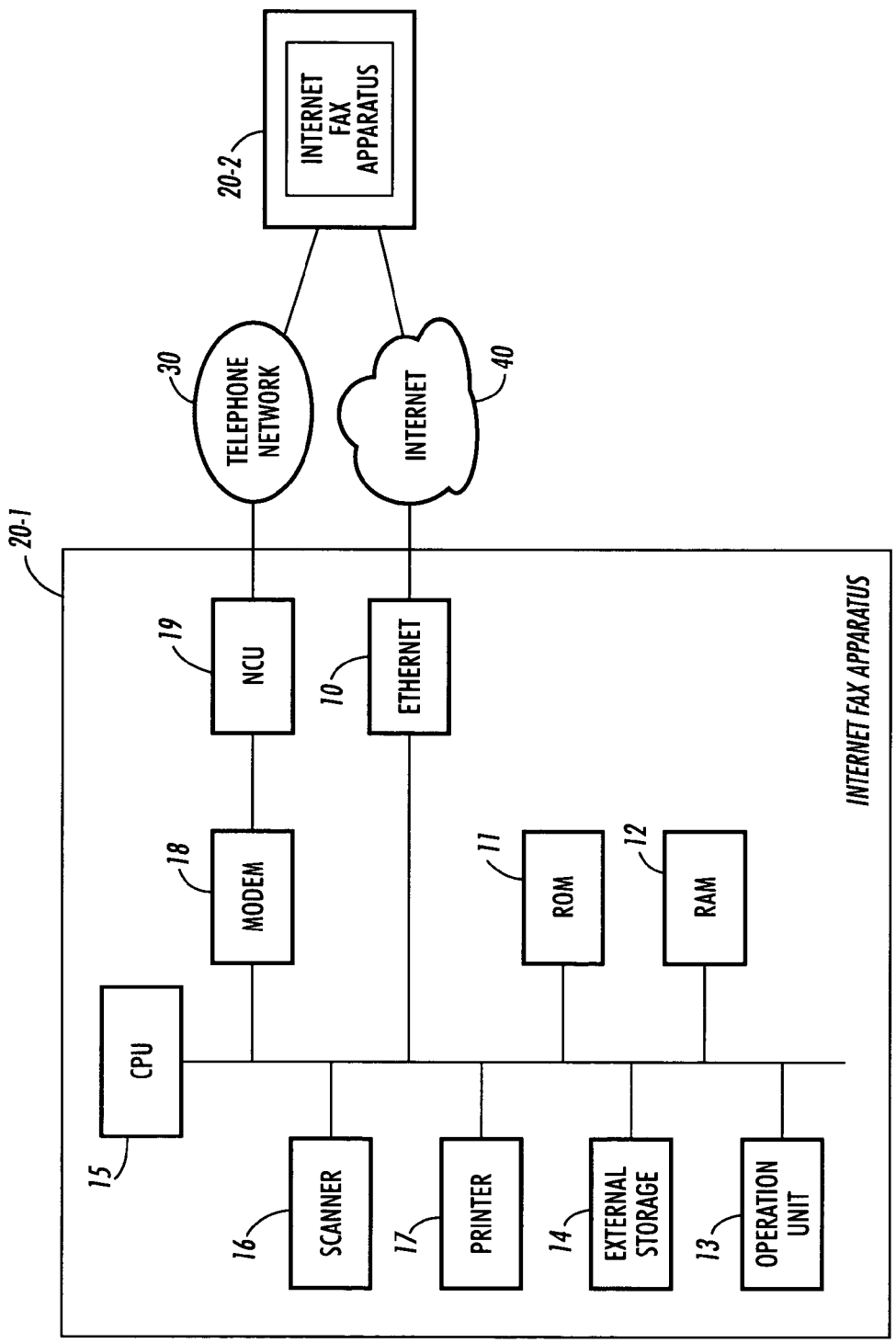

The present invention relates to Internet facsimile methods and in particular to a method for tracking Internet fax jobs to avoid undesired printing of messages generated due to error or other transmission failure conditions.

An Internet facsimile ("IFAX") apparatus is a facsimile apparatus provided with functions of converting image data to a file and transmitting/receiving it over a computer network, a typical example of which is the Internet.

The Internet facsimile apparatus is capable of carrying out usual facsimile communications over a Public Switched Telephone Network ("PSTN"), and therefore it also can function as apparatus connected between a computer network and PSTN.

In comparison to transmitting an original message formed of, for example, an image and/or one or more accompanying files, to a facsimile apparatus connected to the PSTN, Internet facsimile transmission over a network using the Internet facsimile by E-mail can reduce communication costs compared to transmitting data only over the PSTN.

However, we have determined that a problem arises in the following circumstance: When an original message in an facsimile job is created and sent from an originating Internet facsimile device to a receiving facsimile device, the original message can be subject to transmission back to the originating Internet facsimile device as a return message due to an error condition, such as a failure in transmission over the network or a failure in achieving completed transmission and confirmation at the intended receiving device. Such a return message (sometimes characterized as a "bounced message"), is received by the originating device and is typically accepted by the conventional apparatus as a message legitimately transmitted and intended for printing, and not as a message sent due to a failure in transmission or receipt at the intended receiving device. As a result, and because the originating Internet facsimile device is typically configured to print all incoming messages, there occurs automated printing of, usually, the full extent of the return message and all of its attachments.

This result, observable in conventional apparatus, is certainly problematic in the instance when the original message contains confidential information or otherwise sensitive document(s) which may be intended only for restricted distribution and when the return message includes such confidential or sensitive information within the return message for one of its attachments; this information should not be printed at the originating device. With respect to other, non-sensitive documents, such printing is typically not desired because it unnecessarily consumes printing resources and materials. Nor is it desirable to find that a multitude of sheets of paper have been generated at the originating device because a return message includes garbled or extraneous characters, some of which may be interpreted as, for example, page break codes.

Accordingly, a method for tracking facsimile jobs may be implemented according to the present invention to provide a method for facsimile transmission that is relieved of one or more of the foregoing disadvantages in the conventional facsimile transmission methods found in the prior art.

According to an aspect of the present invention, a method for tracking facsimile jobs may be employed to examine, at an originating device, an incoming Internet facsimile transmission for information indicating that the transmission originated at the originating device, in which case the incoming messages are determined to be the result of an error condition. Incoming transmissions so determined are not printed, whereas other types of incoming transmissions that are determined to be transmissions legitimately desired (i.e., "valid") for printing are indeed printed.

According to another aspect of the present invention, according to the foregoing scheme for examining an incoming Internet facsimile transmission, information in the transmission that is indicative of the source address is compared to information indicative of the originating address. A determination that the two addresses match can act as an indicator that the incoming transmission is the result of a "round-trip job" that originated at the originating device and yet is desired to be printed. Such "round-trip jobs" are therefore afforded special status and are considered valid for printing.

According to another aspect of the present invention, incoming messages detected as representing "round-trip jobs" are distinguished from return messages and the former are considered valid for printing. For example, according to the foregoing scheme, message addressing information such as information indicative of the "TO address" and information indicative of the "FROM address" are compared, a determination that the two addresses match can act as an indicator that the incoming transmission is the probably not the result of an error condition and may be printed.

According to another aspect of the present invention, information indicative of an error condition is extracted and examined from a plurality of locations within the overall Internet facsimile transmission, such as within the message header, message identification, and envelope identification. Additional information subject to examination may be extracted from a Delivery Status Notification (DSN) and Message Delivery Notification (MDN).

According to another aspect of the present invention, the originating device is configured to embed one or more indicia in an originating transmission, with such indicia being suitable for subsequent examination by the originating device so as to determine if, in the instance of a return transmission, the return transmission actually originated from the originating device. As a result, the aforementioned determination of validity can be enhanced.

According to another aspect of the present invention, the aforementioned indicia are embedded in the originating transmission in the form of a plurality of redundant indicia. As a result, the effects of information stripping that sometimes occurs by mail servers during the transmission of the original message and/or transmission of the return message is obviated.

Figure 2:
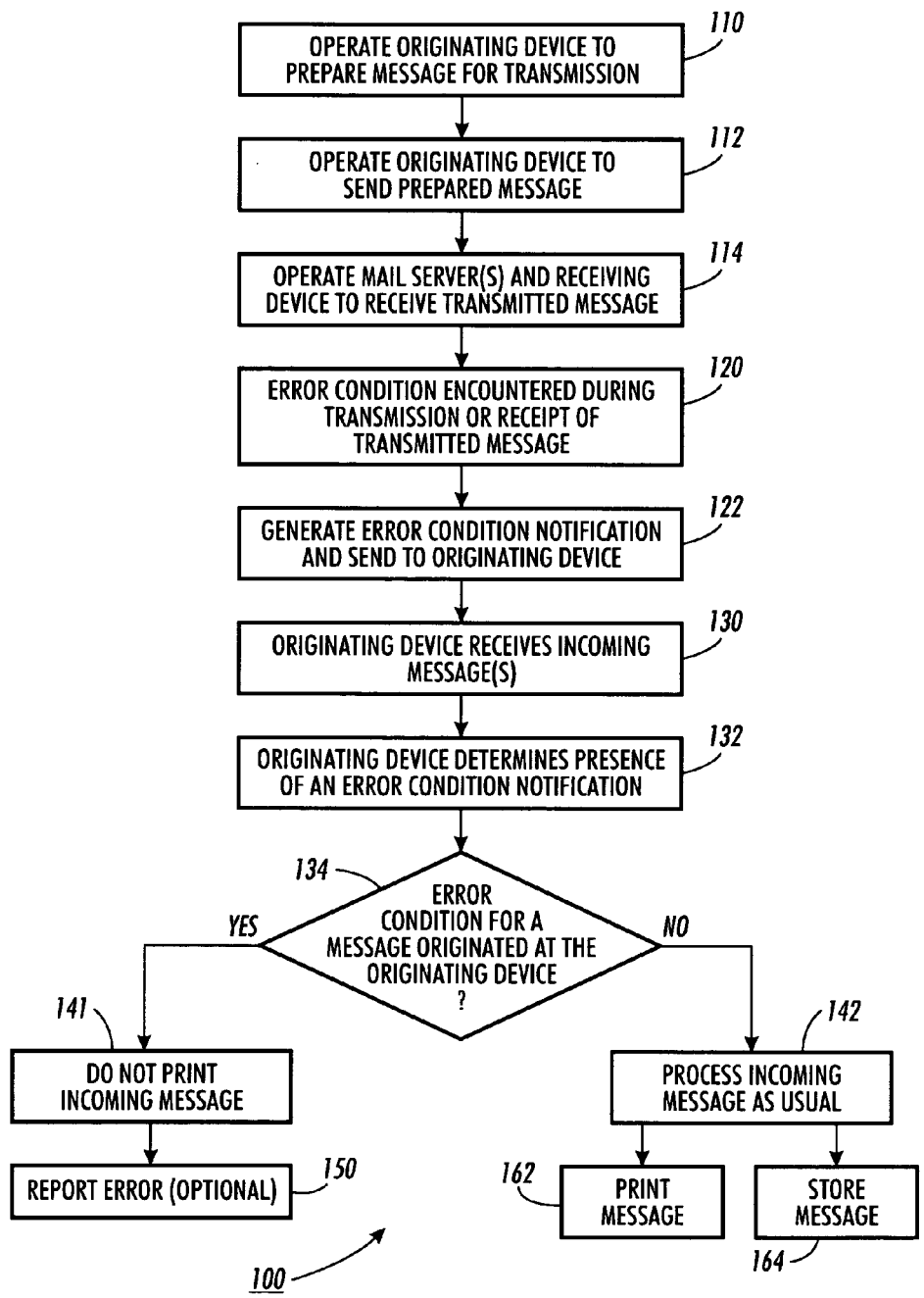

The above and other features of the invention will appear more fully hereinafter from a consideration of the following description taken in connection with the accompanying drawings wherein one example is illustrated by way of example, in which:

FIG. 1 is a network configuration when carrying out data communications using an facsimile method of the present invention; and FIG. 2 is a block diagram showing the basic method steps of a method for tracking facsimile jobs according to an embodiment of the present invention.

With reference now to the attached drawings, the embodiments of the present invention are explained in detail below.

Turning now to FIG. 1, there is illustrated a network configuration for facsimile communications using one or more Internet facsimile apparatus operable according to an embodiment of the present invention.

Ordinary facsimile apparatuses can communicate images only over PSTN 30. On the other hand, Internet facsimile apparatus 20-1, 20-2 can perform normal facsimile communications over PSTN 30. Internet facsimile apparatus can further communicate images with other facsimile devices and personal computers or servers (not shown) over the Internet 40, which is a world-wide computer network.

Image communications over a network are performed, for example, by compressing image data, converting them to a TIFF file and text-coding the TIFF file, then adding it to the data section of e-mail in accordance with such as MIME (Multipurpose Internet Mail Extensions) and transmitting/receiving it as E-mail.

As shown in the drawing, the main system of the Internet facsimile apparatus 20-1 comprises ROM 11, RAM 12, data memory 14, Ethernet interface 10, scanner 16, printer 17, modem section 18, CPU 15; these blocks are connected to one another over a bus and CPU 15 controls operations of the blocks in a centralized manner.

ROM 11 stores requisite programs to operate the apparatus 20-1 and CPU 15 executes the programs(s).

Referring still to FIG. 1, in the transmission of an original message, the Internet facsimile apparatus 20-1 functions as the transmitting side, and the Internet facsimile apparatus 20-2 functions as the receiving side. Mail servers and other devices (not shown) employed in the transmission of the original message over the Internet 40 may be subject to an error condition and can serve as the transmitting side of a return message. Similarly, Internet facsimile device 20-2 and other devices such as traditional facsimile apparatus that are connected to the telephone network 30 may be subject to an error condition and can cause the creation of a return message.

In the illustrated example, the internal structure of the Internet facsimile apparatus 20-2 is the same as the Internet facsimile apparatus 20-1. The telephone network 30 is used for traditional facsimile communication such as by the G3 protocol. The Internet 40 includes both narrow and wide area networks usable for Internet e-mail communication.

In typical practice, a scanner 16 serves to read an original and converts it into image data. The printer 17 is capable of printing image data as an image on a printing sheet. The modem 18 is operable for modulating and demodulating a facsimile protocol signal and image signal. The NCU 19 is connected to the telephone network 30 to make an outgoing call to and receive an incoming call from the line and to interface analog signals. The Ethernet interface 10 is connected to the Internet 40 to exchange digital signals such as TCP/IP packets. The ROM 11 stores control programs and control data of the Internet facsimile apparatus 20-1. The CPU 15 executes these control programs and data. The RAM 12 is used as a work area for the control programs of the Internet facsimile apparatus 20-1 and stores control data and destination data. The CPU 15 accesses these data in the RAM 12. The operation unit 13 includes an operator interface with which an operator designates a destination in transmission. The control programs and control data can also be stored in the external storage 14. If this is the case, these control programs and data are loaded into the RAM 12 and executed by the CPU 5.

Turning now to FIG. 2, there is illustrated a method for tracking facsimile jobs which operates according to the present invention.

In step 110, a first Internet facsimile device ("originating device") is operated to prepare a message for transmission. In step 112, the originating device is operated to send the prepared message over the Internet. In step 114, more devices such as mail servers and, ultimately, a receiving device are operated to deliver the prepared message over the Internet to its ultimate destination. As indicated in step 120, an error condition may occur at any point after the prepared message is placed on the network; such a condition can, for example, occur at a mail server employed to relay the prepared message, or at the receiving device that was intended, in the preparation of the prepared message by the originating device, to be single, ultimate recipient of the prepared message. In step 122, as a result of the error condition, an error condition notification is created and sent in a return message to the originating device over the network.

In step 130, the originating device receives the return message as one incoming message among other incoming messages sent from a variety of sources. Typically, therefore, the return message may be but one of an incoming stream of messages, such messages having been sent not only from the receiving device but also from other devices capable of transmitting to the originating device over the Internet.

In step 132, the originating device begins a process for distinguishing the return message from other incoming messages by detecting the presence of the error condition notification in the return message.

In step 134, the originating device further determines whether the return message is associated with a prepared message that originated at the originating device.

If the determination in step 134 is affirmative, the process flow continues to step 141 wherein the originating device proceeds to process the return message according to a first configuration, which in the preferred embodiment will disallow printing of the return message, and in an optional step 150, the arrival of the return message is noted by use of a error reporting mechanism. If the determination is negative, the process flow continues to step 142 wherein the return message is considered a incoming message intended for printing, and is processed according to a second configuration of the originating device intended for such incoming messages. In the preferred embodiment, such second configuration includes printing of the return message as a valid incoming message.

As indicated in steps 162 and 164, a valid incoming message is respectively printed and/or stored for subsequent use.

EXAMPLE

In a tested example of the method described herein, email was sent to two recipients; one being a valid user and the other being an invalid user (Goofy@plutosplace.daisy). The Mail Server configured was a "Sendmail" mail server.

The email was successfully delivered to the valid email address and was rejected at the Mail Server for the invalid email address. The Mail Server for the invalid email address sent a return email message (also known as a "bounced" message) back to the originator of the email message.

A predefined origination identifier, designed for the purpose of the test example as a string of about twenty alphanumeric characters plus a fixed string component, with the makeup of this string being bit arbitrary and sufficiently random such that it is highly unlikely to appear in a valid email message, had been included in the header of the original message. This predefined origination identifier was found to be included and intact within the return email message. That is, this origination identifier had been added to a plurality of locations in the outbound email, and at least one of those instances was sensed upon the receipt of the return message at the originating device. The origination identifier was confirmed as matching its counterpart that was stored on the originating device. Accordingly, the return message was distinguished from a valid incoming message and was not printed. Other incoming messages that were determined to be valid incoming messages were printed.

The present invention can be applied to a system constituted by a plurality of devices (e.g., host computer, interface, reader, and printer) or to an apparatus (e.g., copying machine or facsimile) comprising a single device.

Further, the object of the present invention can also be achieved by providing a storage medium storing program codes of software for performing the aforesaid functions according to the embodiment to a system or an apparatus, reading the program codes with a computer (e.g., CPU or MPU) of the system or apparatus from the storage medium, and then executing-the program. In this case, the program codes read from the storage medium realize the functions according to the embodiments, and the storage medium storing the program codes constitutes the invention.

Further, the storage medium, such as a floppy disk, a hard disk, an optical disk, a magnetooptical disk, CD-ROM, CD-R, a magnetic tape, a nonvolatile type memory card, and ROM can be used for providing the program codes.

When the present invention is applied to the storage medium, this storage medium stores program codes for executing processes corresponding to the aforementioned program flow.

Furthermore, in addition to method being realized by executing program codes which are read by a computer, the present invention includes embodiments wherein an Operating System or the like operated on the computer to perform processes in accordance with designations of the program codes, and realizes functions according to the above embodiments.

The foregoing description refers to the Internet facsimile apparatus as an example of communication terminal, but the scope of the present invention also includes other communication terminals. For example, embodiments of the present invention may be operated on a personal computer provided with a LAN card or modem to have access to the Internet. It is possible to connect a scanner or printer to the personal computer via an external interface. The present invention also applies to operation of a network scanner used in tandem with a network printer, or network copier having a network communication interface. Furthermore, the present invention also applies to operation of multifunction devices, image decoders, and the like having physically or operationally conjoined functional components such as a scanner, printer, copier and FAX.

The present invention also includes a computer readable storage medium storing program codes which allows the computer to execute the same processing as the facsimile apparatus according to the embodiment above.

The present invention is not limited to the above described embodiments, and various variations and modifications may be possible without departing from the scope of the present invention.

What is claimed is:

1. A method for tracking facsimile jobs, comprising of:
   (a) determining whether a return message is associated with a prepared message that originated at an originating device, and
   (b) in response to an affirmative determining, interpreting the return message as an incoming message not intended for printing and processing the return message according to a first predetermined configuration of the originating device including disallowing printing of the return message;
   whereby in response to a negative determining, an incoming message is interpreted as a valid message intended for printing and is processed according to a second predetermined configuration of the originating device;
   wherein the return message includes first information indicative of a destination address and second information indicative of an originating address, the method further comprising:
   comparing the first and second information;
   in response to the comparing, interpreting a match of the first and second information as being the result of a round-trip job which originated at the originating device and which is intended for printing; and
   in response to the match of the first and second information, processing the return message according to the second predetermined configuration.

2. The method of claim 1, wherein the determining further comprises detecting the presence of information indicative of the error condition in the return message.

3. The method of claim 2, further comprising reporting the arrival of the return message by use of a error reporting mechanism.

4. The method of claim 1, wherein the determining further comprises extracting information indicative of an error condition from a plurality of locations within the return message.

5. The method of claim 4, wherein the extracting further comprises extracting information indicative of an error condition from within at least one of a message header, a message identification, an envelope identification, a Delivery Status Notification (DSN), and a Message Delivery Notification (MDN).

6. The method of claim 1, including transmitting the prepared message as a facsimile communication over a telephone network.

7. The method of claim 1, including transmitting the prepared message as a facsimile communication over a wide area network.

8. The method of claim 1, including transmitting the prepared message as an Internet facsimile message over the Internet.

9. A method for tracking facsimile jobs, comprising of:
   (a) determining whether a return message is associated with a prepared message that originated at an originating device, and
   (b) in response to an affirmative determining, interpreting the return message as an incoming message not intended for printing and processing the return message according to a first predetermined configuration of the originating device including disallowing printing of the return message;
   whereby in response to a negative determining, an incoming message is interpreted as a valid message intended for printing and is processed according to a second predetermined configuration of the originating device;
   wherein preparing the prepared message further comprises embedding indicia in the prepared message, with such indicia being suitable for subsequent examination by the originating device in order to determine whether the return message originated from the originating device.

10. The method of claim 9, wherein the embedded information is provided in the form of a plurality of redundant indicia.

* * * * *